US009007278B2

(12) United States Patent
Seki et al.

(10) Patent No.: US 9,007,278 B2
(45) Date of Patent: Apr. 14, 2015

(54) BRIGHTNESS CONTROLLER, BRIGHTNESS CONTROL METHOD, AND COMPUTER PROGRAM PRODUCT

(75) Inventors: Michio Seki, Adachi-ku (JP); Kazuaki Yamaguchi, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 900 days.

(21) Appl. No.: 13/069,058

(22) Filed: Mar. 22, 2011

(65) Prior Publication Data

US 2012/0001949 A1 Jan. 5, 2012

(30) Foreign Application Priority Data

Jun. 30, 2010 (JP) ................................. 2010-150380

(51) Int. Cl.
| | | |
|---|---|---|
| G09G 5/00 | (2006.01) | |
| G09G 5/10 | (2006.01) | |
| G06F 3/038 | (2013.01) | |
| G06F 3/14 | (2006.01) | |

(52) U.S. Cl.
CPC ................ *G09G 5/10* (2013.01); *G06F 3/1431* (2013.01); *G09G 2320/0626* (2013.01); *G09G 2330/021* (2013.01); *G09G 2354/00* (2013.01)

(58) Field of Classification Search
CPC . G09G 3/2092; G09G 3/2096; G09G 3/1431; G09G 2320/0626; G09G 5/10; G09G 2330/021; G09G 2354/00; G06F 1/3265; G06F 1/3287; G06F 3/1423
USPC ...................... 345/1.1–1.3, 204–699; 715/773
See application file for complete search history.

(56) References Cited

U.S. PATENT DOCUMENTS

| | | | |
|---|---|---|---|
| 6,469,267 B1 * | 10/2002 | Welsh et al. ................... | 200/512 |
| 6,509,911 B1 * | 1/2003 | Shimotono .................... | 715/761 |
| 7,253,814 B2 * | 8/2007 | Kim et al. ...................... | 345/211 |
| 7,605,829 B2 | 10/2009 | Oh | |
| 2005/0017994 A1 | 1/2005 | Oh | |
| 2010/0117927 A1 | 5/2010 | Amagami et al. | |

FOREIGN PATENT DOCUMENTS

| | | |
|---|---|---|
| JP | 08-263174 | 10/1996 |
| JP | 2000-163035 | 6/2000 |
| JP | 2000-284253 | 10/2000 |
| JP | 2004110456 | 4/2004 |
| JP | 2005043894 | 2/2005 |
| JP | 2008125377 | 6/2008 |
| JP | 2008152377 | 7/2008 |

(Continued)

OTHER PUBLICATIONS

Japanese Patent Application No. 2010-150380, Notice of Rejection, mailed Jun. 28, 2011, (with English Translation).

(Continued)

*Primary Examiner* — Kathy Wang-Hurst
*Assistant Examiner* — David Tung
(74) *Attorney, Agent, or Firm* — Blakely, Sokoloff, Taylor & Zafman LLP

(57) ABSTRACT

According to one embodiment, a brightness controller includes a plurality of display modules, a specifying module, and a controller. The display modules each include a display screen the brightness of which is adjustable. The specifying module specifies at least one of the display modules to display an application. The controller individually controls the brightness of the display screen of the display module specified by the specifying module based on features of the application displayed on the display module.

3 Claims, 11 Drawing Sheets

(56) References Cited

FOREIGN PATENT DOCUMENTS

| JP | 2009177595 | 8/2009 |
|---|---|---|
| JP | 2010117569 | 5/2010 |

OTHER PUBLICATIONS

Japanese Patent Application No. 2010-150380, Decision to Grant a Patent, mailed Apr. 17, 2012, (with English Translation).

* cited by examiner

FIG.6

| SOFTWARE | OPERATION | CONTROL OBJECT | BRIGHTNESS CONTROL |
|---|---|---|---|
| SOFTWARE KEYBOARD | ACTIVATED | - | REDUCE |
| SOFTWARE KEYBOARD | DEACTIVATED | - | INCREASE |
| VIDEO PLAYER SOFTWARE | NO OPERATION FOR PREDETERMINED TIME | FIRST LCD TOUCH PANEL DEVICE | REDUCE |
| ⋮ | ⋮ | ⋮ | ⋮ |

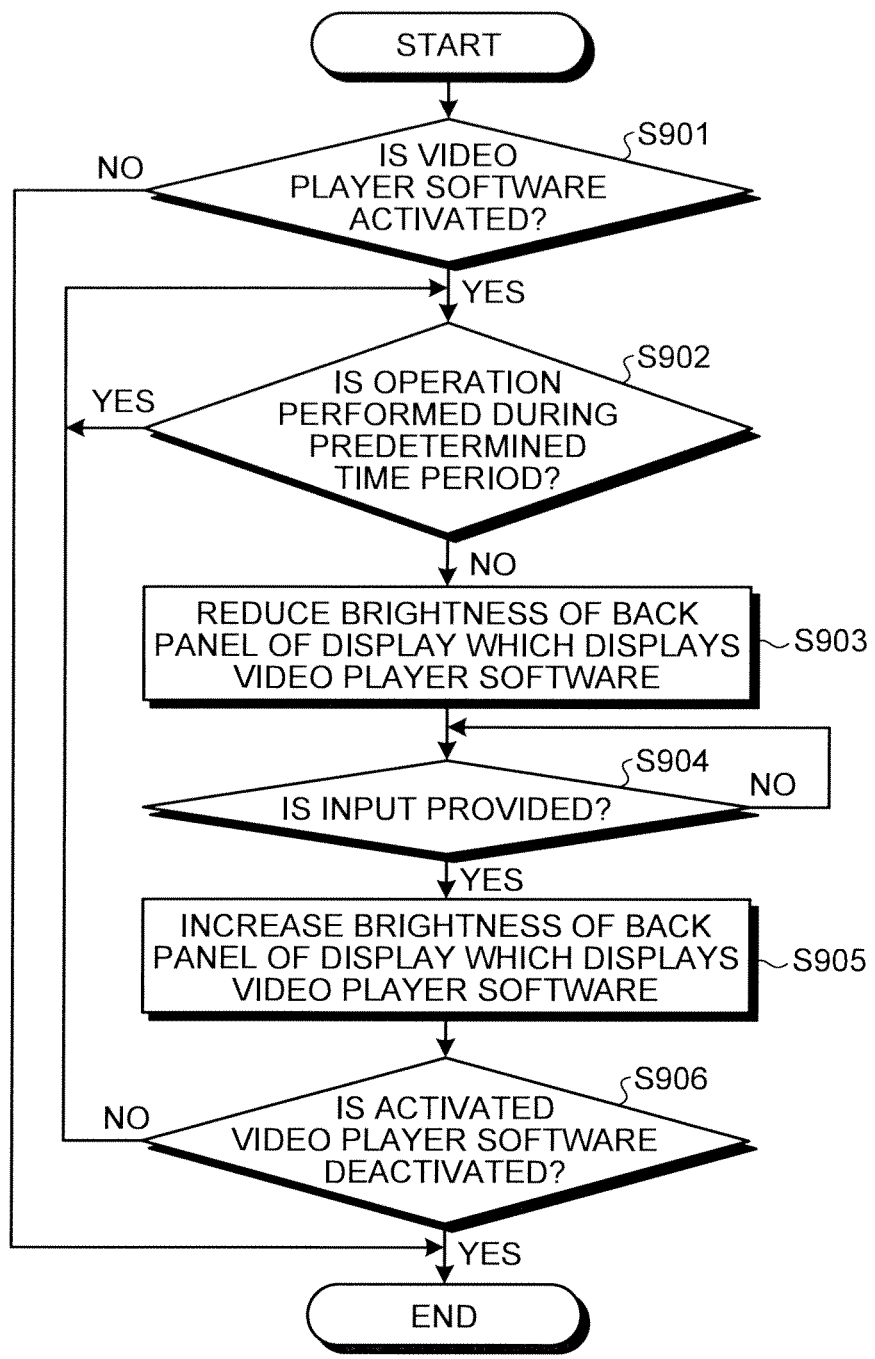

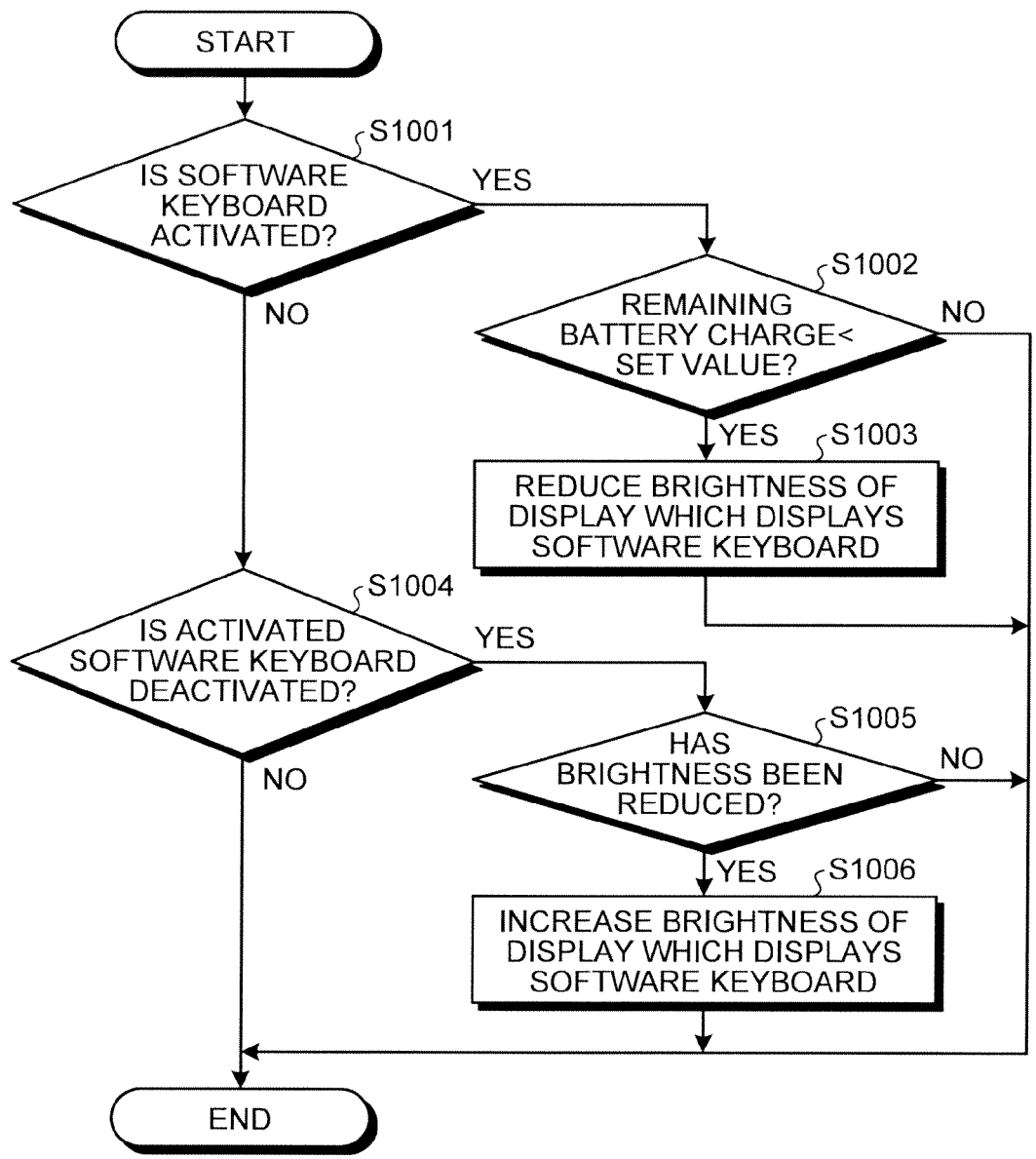

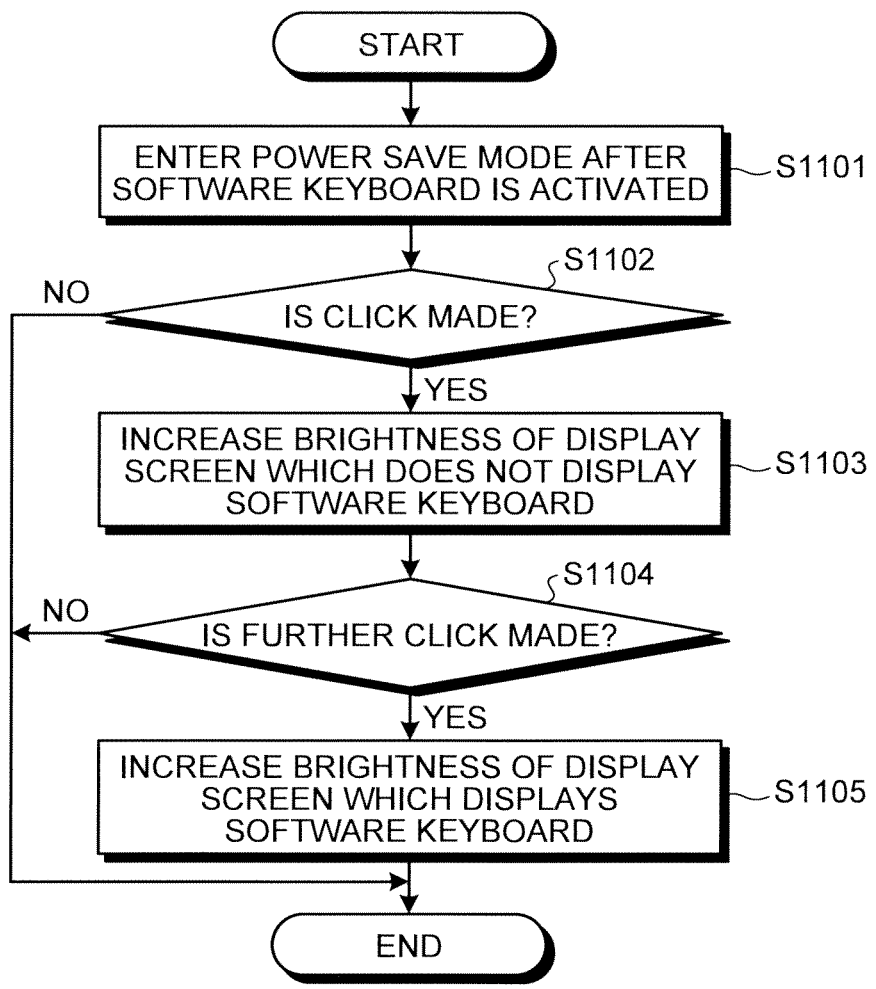

US 9,007,278 B2

BRIGHTNESS CONTROLLER, BRIGHTNESS CONTROL METHOD, AND COMPUTER PROGRAM PRODUCT

CROSS-REFERENCE TO RELATED APPLICATIONS

This application is based upon and claims the benefit of priority from Japanese Patent Application No. 2010-150380, filed Jun. 30, 2010, the entire contents of which are incorporated herein by reference.

FIELD

Embodiments described herein relate generally to a brightness controller, a brightness control method, and a computer program product.

BACKGROUND

There have been proposed various technologies to reduce the power consumption of computers. For example, a computer enters power save mode when receiving no input for a predetermined period of time.

In recent years, along with an increase in operation that has to be performed on the computer, it has been required to widen the display used as a work space. In response to such a requirement, there have been provided computers with a plurality of displays. To use a computer having a plurality of displays for a long time, it is necessary to consider how to reduce the power consumption.

There has been proposed a conventional technology to reduce the power consumption of a computer with a plurality of displays by controlling the brightness of the displays differently.

Although software displayed on each of the displays needs to be taken into account to perform different brightness control on the displays, the conventional technology does not take into account it.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary schematic diagram of a table structure of a setting file in the first embodiment;

FIG. 9 is an exemplary flowchart of the operation of the PC to control the brightness with respect to the video player application in the first embodiment;

FIG. 10 is an exemplary flowchart of the operation of a PC to control the brightness with respect to a software keyboard according to a second embodiment; and FIG. 11 is an exemplary flowchart of the operation of a PC to control the brightness when waking up from the power save mode according to a third embodiment.

DETAILED DESCRIPTION

In general, according to one embodiment, a brightness controller comprises a plurality of display modules, a specifying module, and a controller. The display modules each comprise a display screen the brightness of which is adjustable. The specifying module is configured to specify at least one of the display modules to display an application. The controller is configured to individually control the brightness of the display screen of the display module specified by the specifying module based on features of the application displayed on the display module.

While the brightness controller of the embodiments will be described herein as a notebook personal computer (PC), it is not so limited. The brightness controller may be any device such as a mobile phone, a portable game machine, or the like.

Figure 1:
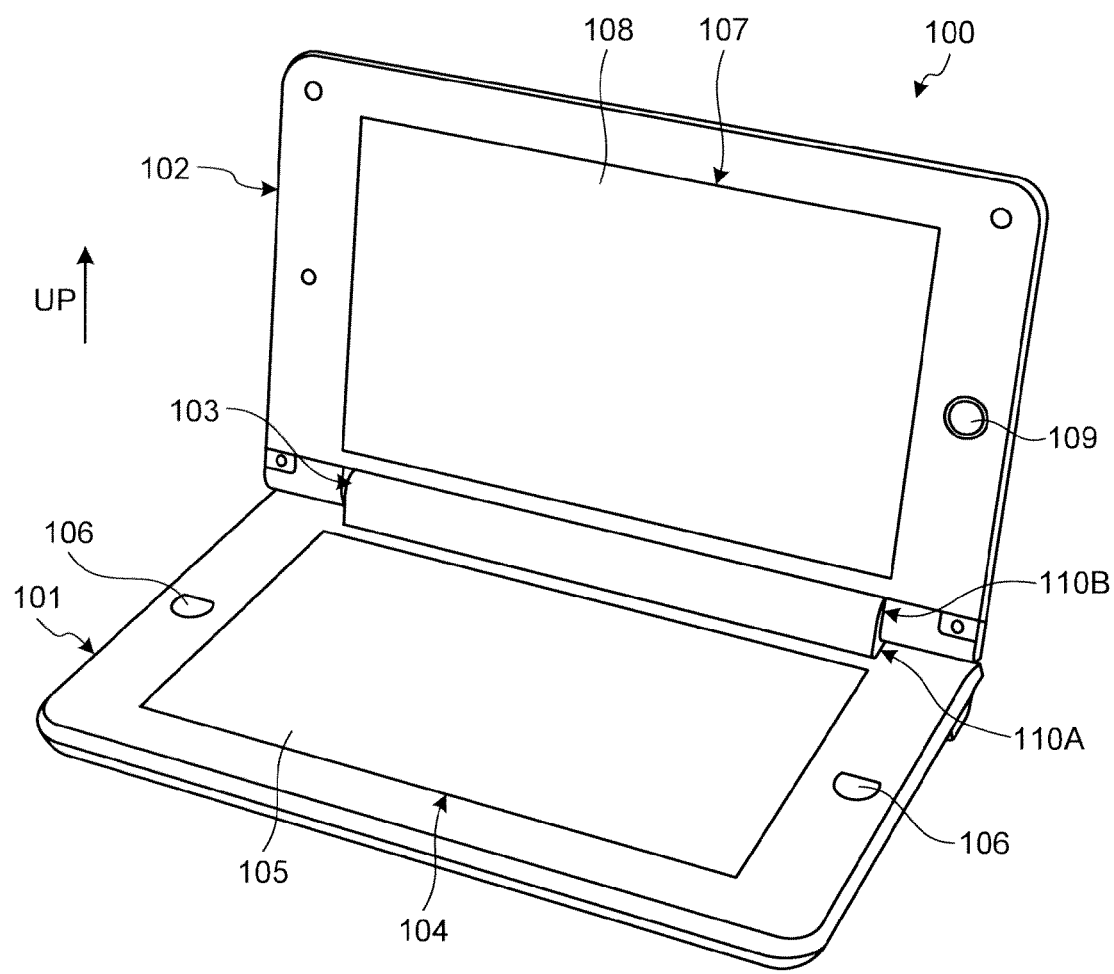
FIG. 1 is an exemplary external view of a personal computer (PC) according to a first embodiment.

FIG. 1 is an external perspective view of a PC 100 according to a first embodiment. As illustrated in FIG. 1, the PC 100 comprises a flat rectangular first body 101 and a flat rectangular second body 102. The first body 101 and the second body 102 are connected via a joint 103 to be relatively rotatable.

As illustrated in FIG. 1, when the open angle between the first body 101 and the second body 102 is relatively small, the PC 100 is used as being, for example, placed on a desk. When the first body 101 and the second body 102 are relatively rotated on the joint 103 such that the open angle between them is relatively larger than that of FIG. 1, the PC 100 is used as being, for example, held by the user with his/her both hands.

The first body 101 is provided with a first liquid crystal display (LCD) touch panel device 105, push button mechanisms 106, and the like. The first LCD touch panel device 105 comprises a display module such as LCD provided with a touch panel 104. Meanwhile, the second body 102 is provided with a second LCD touch panel device 108, a push button mechanism 109, and the like. The second LCD touch panel device 108 comprises a display module such as LCD provided with a touch panel 107.

When the PC 100 is open as illustrated in FIG. 1, the user can use the first LCD touch panel device 105, the second LCD touch panel device 108, and the push button mechanisms 106 and 109.

On the other hand, when the PC 100 is closed (not illustrated), the first LCD touch panel device 105, the second LCD touch panel device 108, the push button mechanisms 106 and 109, and the like are hidden inside the first body 101 and the second body 102. In the first embodiment, the first LCD touch panel device 105 and the second LCD touch panel device 108 each function as an input receiver and a display module. Each of the push button mechanisms 106 and 109 and the like also function as an input receiver.

The joint 103 is a component that connects the first body 101 and the second body 102, and is formed as a separate component from the first body 101 and the second body 102.

The joint 103 comprises a first hinge mechanism 110A and a second hinge mechanism 110B that interact with each other. The first hinge mechanism 110A and the second hinge mechanism 110B relatively rotate about the rotation axis by the same angle in opposite directions with respect to the joint 103. If the user rotates either the first body 101 or the second body 102 on the joint 103 to an open position, the PC 100 is opened. If the user rotates either the first body 101 or the second body 102 on the joint 103 to a closed position, the PC 100 is closed. If the user rotates both the first body 101 and the second body 102 on the joint 103 to the open position, the PC 100 is opened. If the user rotates both the first body 101 and the second body 102 on the joint 103 to the closed position, the PC 100 is closed.

Figure 2:
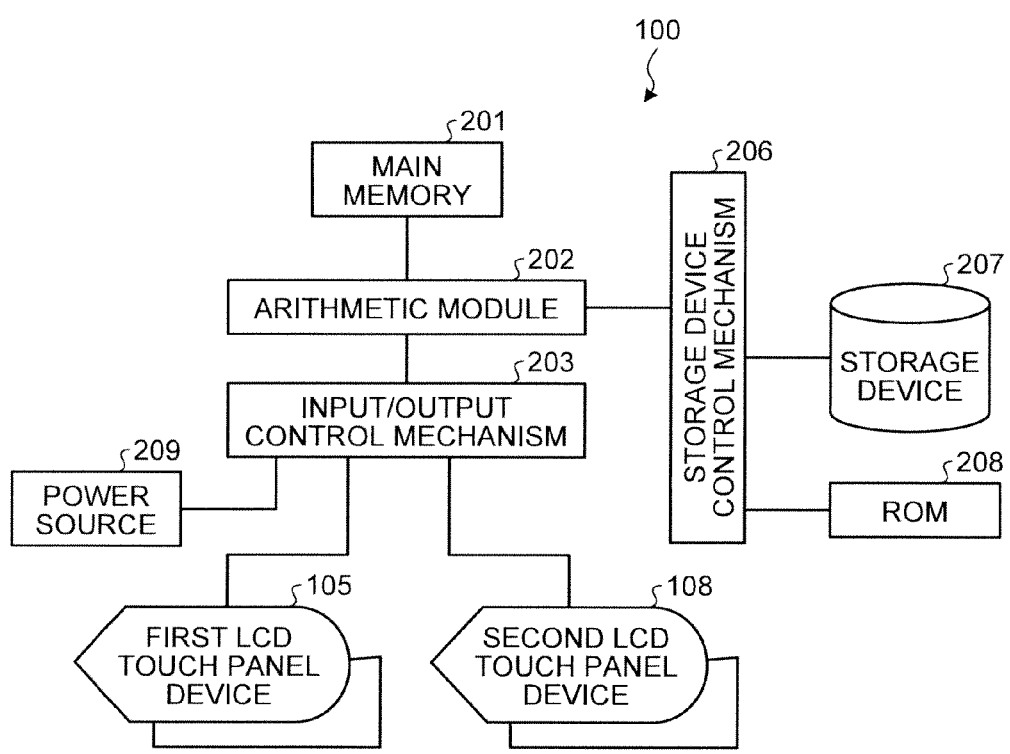
FIG. 2 is an exemplary block diagram of a hardware configuration of the PC in the first embodiment.

FIG. 2 is a block diagram of a hardware configuration of the PC 100. As illustrated in FIG. 2, the PC 100 comprises a main memory 201, an arithmetic module 202, an input/output control mechanism 203, a power source 209, the first LCD touch panel device 105, the second LCD touch panel device 108, a storage device control mechanism 206, a storage device 207, and a read only memory (ROM) 208.

The storage device 207 stores various data. The ROM 208 is a memory that allows reading of stored data only; it does not have a write capability. The ROM 208 stores a program executed by the arithmetic module 202.

The storage device control mechanism 206 is located between the arithmetic module 202 and the ROM 208 and the storage device 207. According to an instruction from the arithmetic module 202, the storage device control mechanism 206 reads data or a program from the ROM 208 and the storage device 207, and also writes data or a program to the storage device 207.

The arithmetic module 202 controls the overall operation of the PC 100. The arithmetic module 202 executes a program read from the ROM 208 using the main memory 201 as a work area.

The main memory 201 comprises a random access memory (RAM) that is readable and writable and is used as a work area of the arithmetic module 202.

The first LCD touch panel device 105 and the second LCD touch panel device 108 each have a display screen the brightness of which is adjustable. According to an instruction form the arithmetic module 202, the first LCD touch panel device 105 and the second LCD touch panel device 108 display data on the display screen. The first LCD touch panel device 105 and the second LCD touch panel device 108 outputs data input through the touch panels 104 and 107, respectively, to the arithmetic module 202 via the input/output control mechanism 203.

The power source 209 is charged to supply power to the PC 100.

The input/output control mechanism 203 is located between the arithmetic module 202 and the power source 209, the first LCD touch panel device 105, and the second LCD touch panel device 108. According to an instruction from the arithmetic module 202, the input/output control mechanism 203 controls the power source 209, the first LCD touch panel device 105, and the second LCD touch panel device 108.

Figure 3:
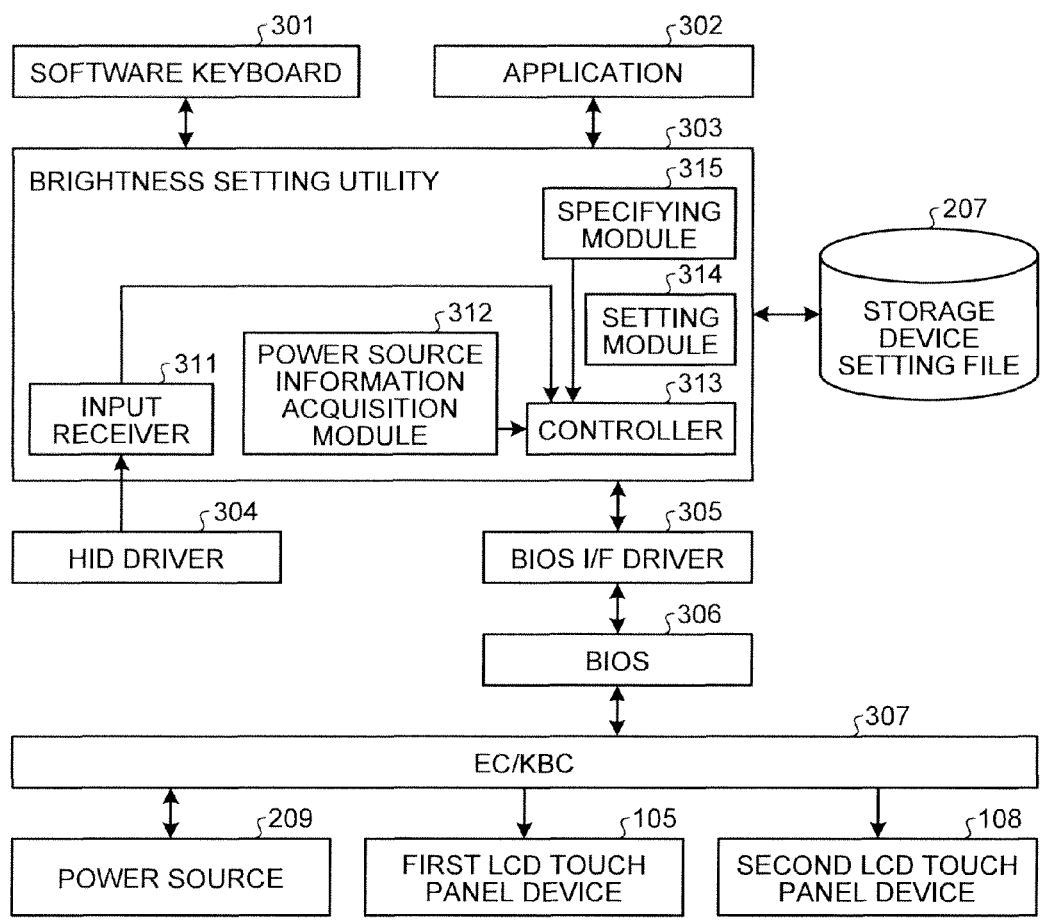
FIG. 3 is an exemplary block diagram of a software configuration to control the PC in the first embodiment.

In the following, a description will be given of a software configuration to control the PC 100. The software configuration is implemented by a program. More specifically, the arithmetic module 202 loads the program from the ROM 208 into the main memory 201 and executes it, thereby implementing the software configuration on the main memory 201. FIG. 3 is a block diagram of the software configuration to control the PC 100 of the first embodiment.

As illustrated in FIG. 3, the PC 100 comprises, as a software configuration, a software keyboard 301, an application 302, a brightness setting utility 303, a human interface device (HID) driver 304, a basic input/output system (BIOS) interface (I/F) driver 305, a BIOS 306, and an embedded controller/keyboard controller (EC/KBC) 307.

The software keyboard 301 is an image of a keyboard displayed on the display screen of the first LCD touch panel device 105. When a key of the software keyboard 301 is clicked on the display screen, a letter or a character is input based on the coordinates of a clicked position. In response to a request from the user, the software keyboard 301 is activated/deactivated.

Figure 4:
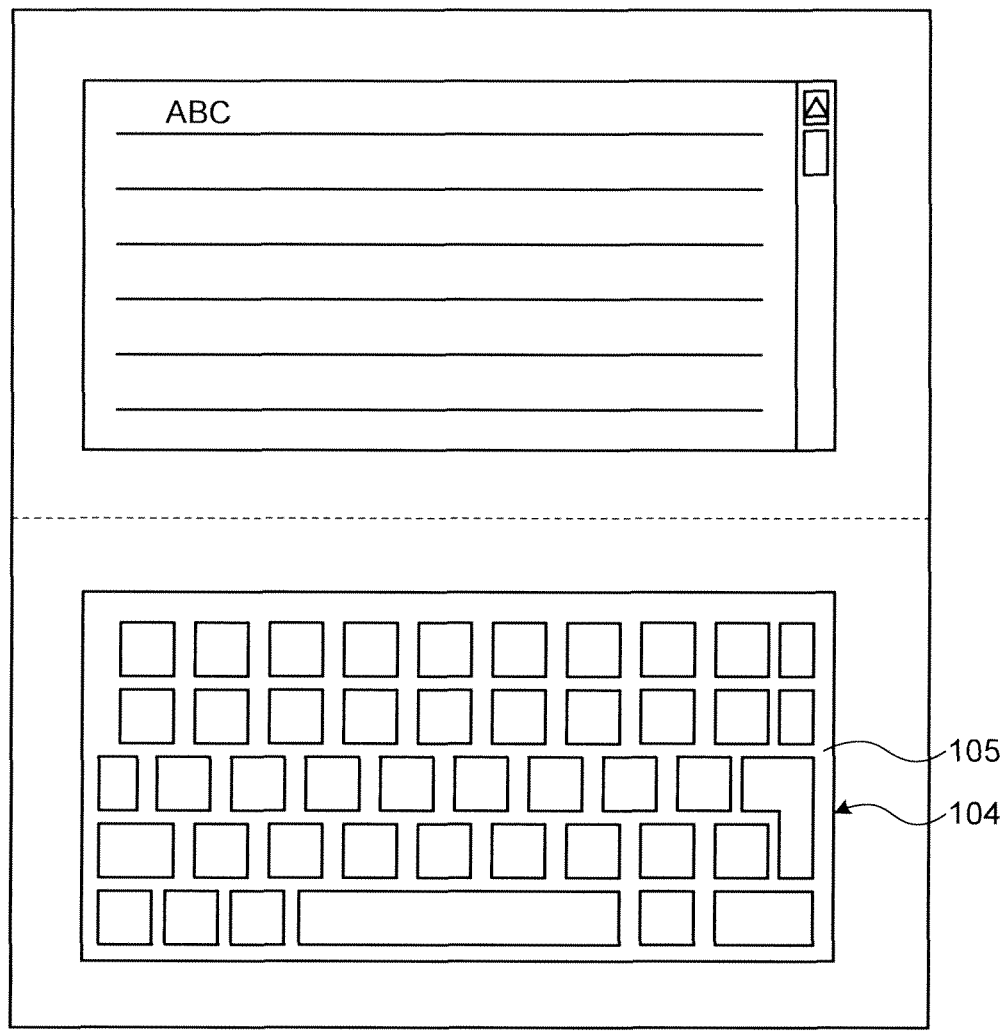
FIG. 4 is an exemplary schematic diagram of an activated software keyboard in the first embodiment.

FIG. 4 illustrates an example of the software keyboard 301 in active mode. As illustrated in FIG. 4, the software keyboard is displayed on the first LCD touch panel device 105. When the user touches the software keyboard, the touch panel 104 recognizes the coordinates of a position touched by the user. After the process of receiving a character string according to the coordinates, the input character string is fed to another application or the like. In this manner, a letter or a character can be input for a document application.

The application 302 is software that runs on the PC 100. The type of the application 302 is not particularly limited, and the application 302 may be a document application, an image management application, a video player application, or the like. When the application 302 is activated, an application screen is displayed on at least one of the first LCD touch panel device 105 and the second LCD touch panel device 108. Where the application screen is displayed varies depending on the type of the application and the use mode.

Figure 5:
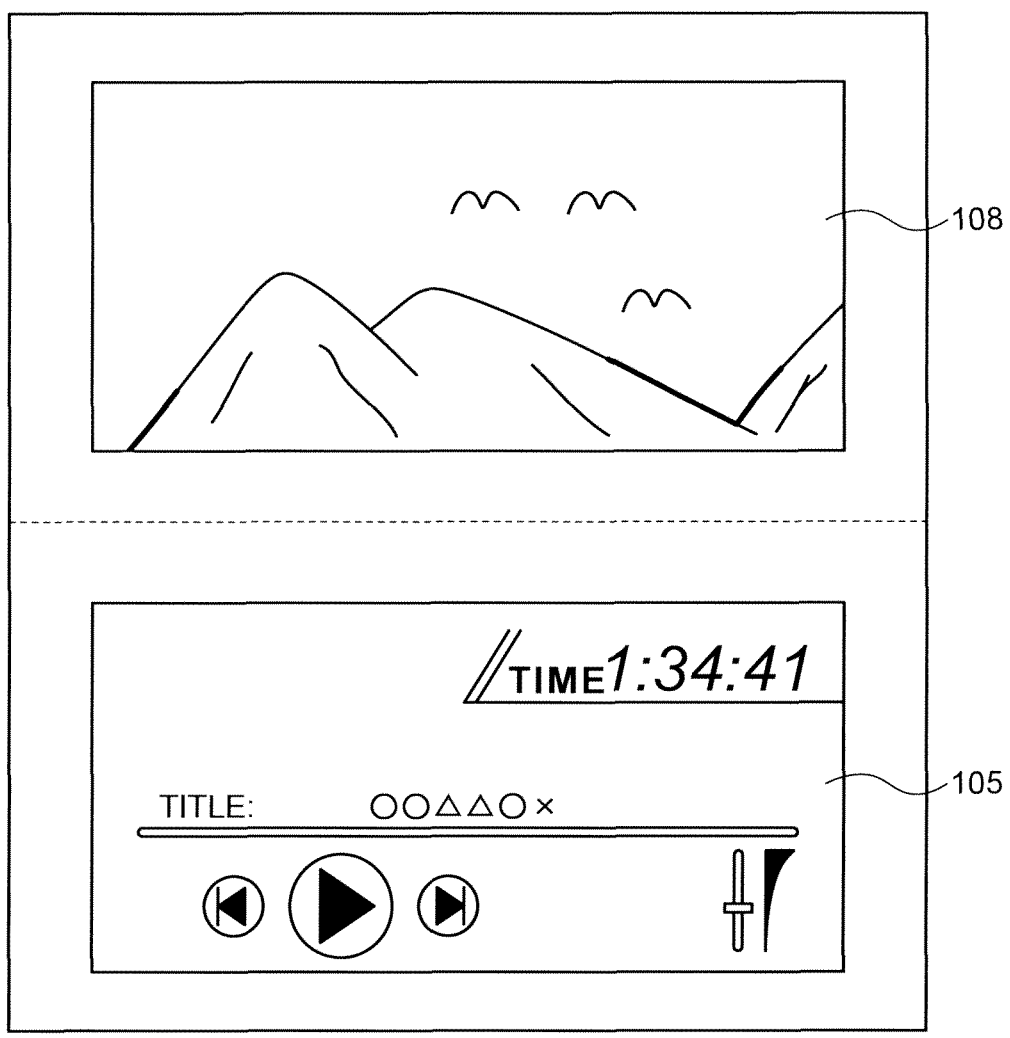
FIG. 5 is an exemplary schematic diagram of a display screen when a video player application is activated in the first embodiment.

FIG. 5 illustrates an example of a display screen when a video player application is activated. As illustrated in FIG. 5, when a video player application of the first embodiment is activated, video is played on the display screen of the second LCD touch panel device 108, while an operation window to play the video is displayed on the display screen of the first LCD touch panel device 105.

The HID driver 304 is in charge of a man-machine interface. The HID driver 304 comprises a driver to operate a keyboard, a mouse, a pointing device, a joystick, a gamepad, and other types of input devices.

The BIOS 306 is a program to control the hardware.

The BIOS I/F driver 305 functions as an interface to exchange data between the brightness setting utility 303 and the BIOS 306.

The EC/KBC 307 is communicably connected to the power source 209, the first LCD touch panel device 105, and the second LCD touch panel device 108, and is a software controller to control them.

The brightness setting utility 303 comprises an input receiver 311, a power source information acquisition module 312, a controller 313, a setting module 314, and a specifying module 315. The brightness setting utility 303 individually controls the brightness of the display screen of the first LCD touch panel device 105 and that of the second LCD touch panel device 108.

The brightness setting utility 303 is capable of exchanging data with the storage device 207. Thus, the brightness setting utility 303 can refer to, for example, a setting file stored in the storage device 207.

FIG. 6 illustrates an example of a table structure of the setting file. As illustrated in FIG. 6, the setting file stores information on software, operation, control object, and brightness control in association with one another.

The software indicates the software keyboard 301, an application, and the like, with respect to which the brightness is to be controlled. The operation indicates the operation of the software. When the operation is performed, the brightness is controlled.

The control object specifies an object to be controlled if the software is displayed on a plurality of displays when invoked. If the software is displayed on only one display, there is no need to set the control object. In this case, for example, "-" is set to the control object. The brightness control indicates specific control to be performed on the control object.

In the example of FIG. 6, it is set that when a "software keyboard" is "activated", the brightness is "reduced" with respect to the display of the "software keyboard".

Referring back to FIG. 3, the specifying module 315 specifies, with respect to an application currently displayed, at least one of the first LCD touch panel device 105 and the second LCD touch panel device 108 as displaying the application.

For example, the specifying module 315 specifies the first LCD touch panel device 105 as a display on which the software keyboard 301 is displayed. For another example, the specifying module 315 specifies the first LCD touch panel device 105 and the second LCD touch panel device 108 as displays on which video player software is displayed.

The input receiver 311 receives input on the display screens of the first LCD touch panel device 105 and the second LCD touch panel device 108 via the EC/KBC 307. The input receiver 311 outputs the input to the controller 313.

The power source information acquisition module 312 acquires remaining power information on the remaining battery charge of the power source 209 that supplies power to the PC 100.

The controller 313 individually controls the brightness of a display screen specified by the specifying module 315 as a display that displays an application based on the features of the displayed application.

The features of the application indicates the unique characteristics of the application and include, for example, the function and usage of the application.

For example, based on the features of the software keyboard 301 that the software keyboard 301 is only required to be displayed on the screen such that the location of keys can be recognized, the controller 313 adjust the brightness of the screen. In the case of the video player software, based on the features that while the brightness needs to be maintained high on the display screen of video, the user does not refer to the operation screen when performing no operation thereon, the controller 313 reduces the brightness of the operation screen when the user performs no operation thereon.

For example, if an application is displayed on either one of the first LCD touch panel device 105 or the second LCD touch panel device 108, the controller 313 controls only the brightness of the display screen of the one that displays the application.

For another example, if an application is displayed on both the first LCD touch panel device 105 and the second LCD touch panel device 108, the controller 313 controls the brightness of the display screen of either one of them based on the features of the application.

The controller 313 controls the brightness with respect to an application according to the setting file stored in the storage device 207. More specifically, when an "application" performs a predetermined "operation", the controller 313 performs "brightness control" associated with the application in the setting file with respect to a corresponding "control object".

The controller 313 individually controls the display screen that displays the application based on the remaining power information acquired by the power source information acquisition module 312.

When the input receiver 311 receives input after the controller 313 controls the brightness of the display screen, the controller 313 controls the brightness again.

For example, when the input receiver 311 receives input after the controller 313 has reduced the brightness in response to a decrease in the remaining battery charge acquired by the power source information acquisition module 312, the controller 313 may increase the brightness.

The setting module 314 sets information in the setting file stored in the storage module 207. That is, the setting module 314 sets operation with respect to each application, control object when the operation is performed, and brightness control to be performed in association with one another.

Figure 7:
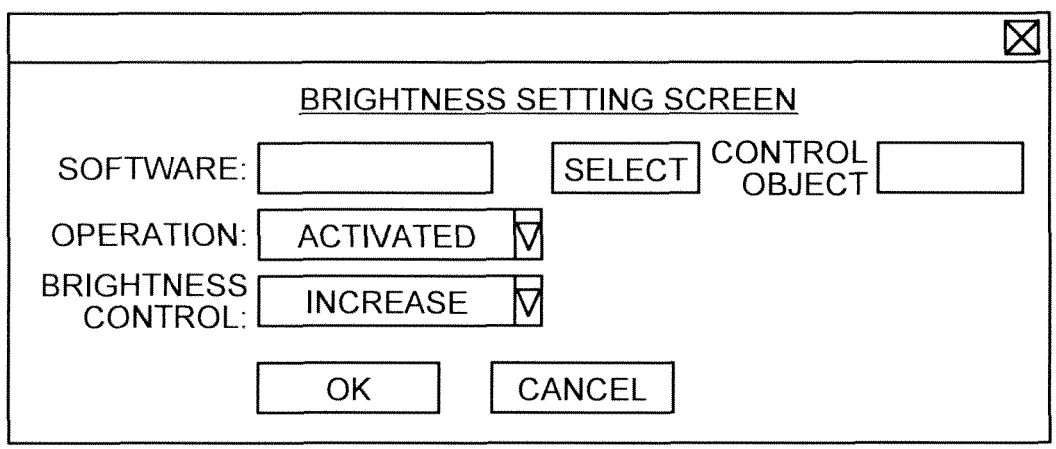
FIG. 7 is an exemplary schematic diagram of a display screen displayed by a setting module to set the setting file in the first embodiment.

FIG. 7 illustrates an example of a display screen displayed by the setting module 314 to set the setting file. As illustrated in FIG. 7, the setting module 314 receives input from the user as to software with respect to which the brightness is controlled, control object, operation, and brightness control, and registers the received settings in the setting file. With this, the brightness of each display can be individually controlled with respect to various software.

Figure 8:
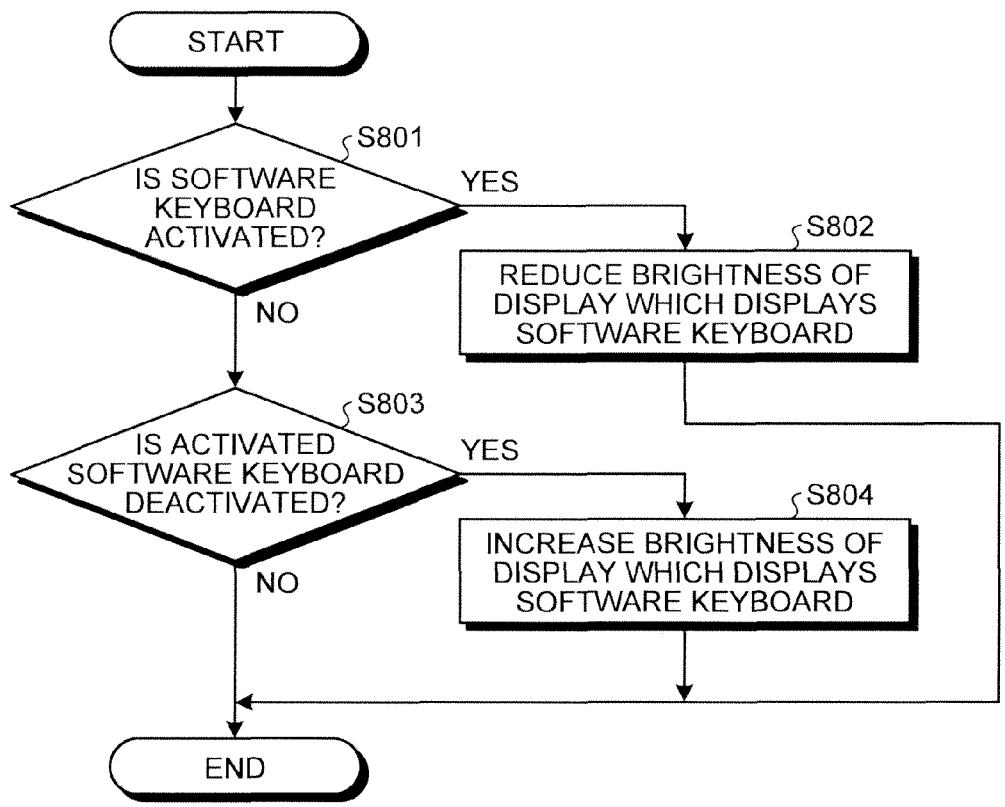
FIG. 8 is an exemplary flowchart of the operation of the PC to control the brightness with respect to the software keyboard in the first embodiment.

In the following, a description will be given of the operation of the PC 100 to control the brightness with respect to the software keyboard 301 according to the first embodiment. FIG. 8 is a flowchart of the operation of the PC 100 to control the brightness with respect to the software keyboard 301 according to the first embodiment.

First, the specifying module 315 detects whether the display of the software keyboard 301 starts, i.e., whether the software keyboard 301 is activated (S801). Having detected that the display of the software keyboard 301 starts (Yes at S801), the specifying module 315 specifies the first LCD touch panel device 105 as a display on which the software keyboard 301 is displayed.

When the first LCD touch panel device 105 starts displaying the software keyboard 301, the controller 313 refers to the setting file stored in the storage device 207, and reads information on brightness control with respect to the software keyboard 301. According to the setting file, the controller 313 reduces the brightness of the first LCD touch panel device 105, on which the software keyboard 301 is displayed, based on that the software keyboard 301 is activated (S802).

On the other hand, when the software keyboard 301 is not activated, i.e., the software keyboard 301 has already been activated or the software keyboard 301 is not active (No at S801), the controller 313 detects whether the activated software keyboard 301 is deactivated (S803). When the controller 313 detects that the software keyboard 301 is not deactivated (No at S803), the process ends.

On the other hand, having determined that the software keyboard 301 is deactivated (Yes at S803), the controller 313 increases the brightness of the first LCD touch panel device 105, which displays the software keyboard 301, according to the setting file (S804).

With the process as described above, the brightness is controlled with respect to the software keyboard 301 in the PC 100.

Next, a description will be given of the operation of the PC 100 to control the brightness with respect to the video player software according to the first embodiment. FIG. 8 is a flowchart of the operation of the PC 100 to control the brightness with respect to the video player software according to the first embodiment.

First, the specifying module 315 detects whether the display of the video player software starts, i.e., whether the video player software is activated (S901). If the specifying module 315 does not detect the start of the display of the video player software (No at S901), the process ends.

On the other hand, having detected that the display of the video player software starts i.e., the video player software is activated (Yes at S901), the specifying module 315 specifies the first LCD touch panel device 105 and the second LCD touch panel device 108 as displaying the video player software.

After that, the controller 313 refers to the setting file stored in the storage device 207, and reads information on brightness control with respect to the video player software. According to the setting file, the controller 313 determines whether operation is performed on the operation screen of the video player software during a predetermined time period (S902). When the controller 313 determines that operation is performed on the operation screen (Yes at S902), the determination is made again at S902.

On the other hand, having determined that operation is not performed on the operation screen during the predetermined time period (No at S902), the controller 313 reduces the brightness of the back panel of only the first LCD touch panel device 105 displaying the operation screen (S903).

After that, the input receiver 311 determines whether input is provided on the first LCD touch panel device 105 and the like (S904). Having determined that no input is provided (No at S904), the determination is made again at S904.

On the other hand, having determined that input is provided (Yes at S904), the controller 313 increases the brightness of the back panel of only the first LCD touch panel device 105 displaying the operation screen (S905).

Then, the specifying module 315 detects whether the activated video player software is deactivated (S906). When the specifying module 315 determines that the video player software is not deactivated (No at S906), the process returns to S902.

On the other hand, when the specifying module 315 determines that the video player software is deactivated (Yes at S906), the process ends.

While the operation is described above as the activation/deactivation of an application, this is by way of example and not limitation. The above process may be performed when display/non-display of the application is switched. For example, when the software keyboard 301 is iconified, the controller 313 may increase the brightness even if the software keyboard 301 is still active. When the software keyboard 301 is de-iconified and displayed again, the controller 313 may reduce the brightness.

The PC 100 of the first embodiment can display a plurality of screens on the first LCD touch panel device 105 and the second LCD touch panel device 108. With the configuration as described above, brightness control is performed individually on the first LCD touch panel device 105 and the second LCD touch panel device 108 according to the condition where the user uses the PC 100. This brightness control achieves the reduction of power consumption.

The PC 100 of the first embodiment controls the brightness of the backlight of the LCD touch panel that displays the software keyboard 301, the operation screen, or the like. As the brightness control, the backlight may be turned off as well as reducing the brightness.

In the first embodiment, while the settings of the setting file is described by way of example as being specified by the setting module 314 based on input by the user, it is not so limited. An application may specify the settings of the setting file. In this case, when an application is installed, brightness control is automatically set according to the features of the application.

The brightness control is not limited as described above. For example, in the case of a learning application, if questions and the like are displayed on the second LCD touch panel device 108, while options and the like are displayed on the first LCD touch panel device 105, the brightness setting utility 303 may perform the brightness control such that the brightness is increased when options are displayed and otherwise the brightness is reduced.

As described above, according to the first embodiment, the brightness setting utility 303 can control the brightness in various manners based on the features of an application running on the PC 100.

According to the first embodiment, the brightness setting utility 303 controls the brightness based on the features of an application with respect to each LCD touch panel device. Thus, when the back panel does not need a high brightness, the power consumption can be reduced.

According to the first embodiment, the settings of brightness control can be specified in the setting file by the setting module 314. Thus, rules can be easily set as specified by the user to adjust the brightness.

With this, when a new application is installed, new brightness control can be set for the application.

A second embodiment will be described. In the first embodiment, examples are described in which the brightness is controlled based on display/non-display of an application alone and in combination with input provided by the user; however, the brightness control is not so limited, and may be performed based on a different combination of conditions.

In the second embodiment, an example will be described in which the brightness is controlled based on display/non-display of an application in combination with the remaining battery charge of the power source 209. The PC 100 of the second embodiment is of basically the same configuration as the PC 100 of the first embodiment, and thus the description will not be repeated.

In the following, a description will be given of the operation of the PC 100 to control the brightness with respect to the software keyboard 301 according to the second embodiment. FIG. 10 is a flowchart of the operation of the PC 100 to control the brightness with respect to the software keyboard 301 according to the second embodiment.

First, the specifying module 315 detects whether the display of the software keyboard 301 starts, i.e., whether the software keyboard 301 is activated (S1001). Having detected that the display of the software keyboard 301 starts (Yes at S1001), the specifying module 315 specifies the first LCD touch panel device 105 as a display on which the software keyboard 301 is displayed.

When the first LCD touch panel device 105 starts displaying the software keyboard 301, the controller 313 refers to the setting file stored in the storage device 207, and reads information on brightness control with respect to the software keyboard 301. In the setting file, it is specified that the brightness is reduced when the remaining battery charge decreases below a set value after the software keyboard 301 is activated. The power source information acquisition module 312 acquires information on the remaining battery charge of the power source 209.

According to the setting file, the controller 313 determines whether the remaining battery charge is below the set value (S1002). If the remaining battery charge is equal to or above the set value (No at S1002), the process ends without the brightness control.

On the other hand, having determined that the remaining battery charge is below the set value (Yes at S1002), the controller 313 reduces the brightness of the first LCD touch panel device 105 displaying the software keyboard 301 (S1003).

When the software keyboard 301 is not activated, i.e., the software keyboard 301 has already been activated or the software keyboard 301 is not active (No at S1001), the controller 313 detects whether the activated software keyboard 301 is deactivated (S1004). When the controller 313 detects that the software keyboard 301 is not deactivated (No at S1004), the process ends.

On the other hand, having determined that the software keyboard 301 is deactivated (Yes at S1004), the controller 313 determines whether the brightness of the software keyboard 301 has been reduced (S1005). When the controller 313 determined that the brightness has not been reduced (No at S1005), the process ends without the brightness control.

On the other hand, having determined that the brightness of the software keyboard 301 has been reduced (Yes at S1005), the controller 313 increases the brightness of the first LCD touch panel device 105 displaying the software keyboard 301 (S1006).

With the process as described above, the brightness is controlled with respect to the software keyboard 301 in the PC 100.

With the process as described above, the brightness of the LCD touch panel device can be reduced based on display/non-display of an application in combination with the remaining battery charge. In the second embodiment, an example is described in which the brightness is controlled based on the remaining battery charge when a software keyboard is displayed; however, the brightness control is not so limited, and may be performed based on a different combination of conditions.

The brightness control may be performed based on a combination of the remaining battery charge and a display condition as to whether the screen is active or the like.

As described above, according to the second embodiment, the brightness is controlled based on user settings related to the remaining battery charge in the setting file. This enables power consumption to be controlled according to the need of the user (priority) as well as achieving the same effect as the first embodiment.

A third embodiment will be described. In the third embodiment, an example will be described in which the brightness of the LCD touch panel device is individually controlled based on user operation. The PC 100 of the third embodiment is of basically the same configuration as the PC 100 of the first embodiment, and thus the description will not be repeated.

The PC 100 of the third embodiment individually controls the brightness of the LCD touch panel device according to user operation while in power save mode.

In the following, a description will be given of the operation of the PC 100 to control the brightness when waking up from the power save mode according to the third embodiment. FIG. 10 is a flowchart of the operation of the PC 100 to control the brightness when waking up from the power save mode according to the third embodiment. It is assumed that settings for this process is specified in the setting file.

First, the PC 100 enters power save mode when no operation is performed after the software keyboard 301 is activated (S1101).

The input receiver 311 determines whether a click is made on the first LCD touch panel device 105 or the second LCD touch panel device 108 (S1102). When the input receiver 311 determines that no click is made (No at S1102), the process ends.

When the input receiver 311 determines that a click is made (Yes at S1102), the controller 313 increases the brightness of the display screen of only the second LCD touch panel device 108 not displaying the software keyboard 301 (S1103).

After that, the input receiver 311 determines whether a further click is made (S1104). When the input receiver 311 determines that no click is made (No at S1104), the process ends.

When the input receiver 311 determines that a click is made (Yes at S1104), the controller 313 increases the brightness of the display screen of the first LCD touch panel device 105 displaying the software keyboard 301 (S1105).

With the process as described above, the brightness can be controlled by simple user operation when the PC 100 wakes up from power save mode.

In the above embodiments, while the PC 100 is described by way of example as having two LCD touch panel devices, the number of LCD touch panel devices is not limited to two. The PC 100 may be provided with three or more LCD touch panel devices.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A brightness controller comprising:
   a plurality of display modules comprising display screens, respectively, wherein brightness of each of the display screens is adjustable;
   a specifying module configured to specify a destination display module, wherein the destination display module is at least one of the display modules and is a destination to display an application, the application being configured to receive an operation from a user;
   a receiver configured to receive an input through at least one of the display modules; and
   a controller configured to control, when the receiver receives an input through one of the display modules while the brightness controller is in power save mode, the brightness of at least one of the display screens of the display modules excluding the destination display module, wherein
   when the input through the one of the display modules is detected once, the controller increases, with respect to the brightness of the one of the display screens of the destination display module, the brightness of the at least one of the display screens of the display modules that excludes the destination display module, and,
   when the input through the one of the display modules is detected more than once, the controller increases the brightness of the one of the display screens of the destination display module.

2. A brightness control method applied to a brightness controller comprising a plurality of display modules comprising display screens, respectfully, wherein brightness of each of the display screens is adjustable, the brightness control method comprising:
- specifying, by a specifying module, a destination display module, wherein the destination display module is at least one of the display modules and is a destination to display an application, the application being configured to receive an operation from a user;
- receiving, by a receiver, an input through at least one of the display modules; and
- controlling, by a controller, when an input through one of the display modules is received while the brightness controller is in power save mode, brightness of at least one of the display screens of the display modules excluding the destination display module, wherein,
- the controlling comprises increasing, when the input through the one of the display modules is detected once, with respect to the brightness of the one of the display screens of the destination display module, the brightness of the at least one of the display screens of the display modules excluding the destination display module, and,
- the controlling comprises increasing, when the input through the one of the display modules is detected more than once, the brightness of the one of the display screens of the destination display module.

3. A computer readable medium including programmed instructions, wherein the instructions, when executed by a computer provided with a plurality of display modules comprising display screens, respectively, wherein brightness of each of the display screens is adjustable, cause the computer to perform a method comprising:
- specifying that a destination display module that is a destination to display an application, the application being configured to receive an operation from a user;
- receiving an input through at least one of the display modules; and
- controlling, when an input through one of the display modules is received while the brightness controller is in power save mode, brightness of at least one of the display screens of the display modules excluding the destination display module, wherein,
- the controlling comprises increasing, when the input through the one of the display modules is detected once, with respect to the brightness of the one of the display screens of the destination display module, the brightness of the at least one of the display screens of the display modules excluding the destination display module, and,
- the controlling comprises increasing, when the input through the one of the display modules is detected more than once, the brightness of the one of the display screens of the destination display module.

* * * * *